(12) United States Patent
Yu et al.

(10) Patent No.: US 10,543,714 B2
(45) Date of Patent: Jan. 28, 2020

(54) MICROCLIMATE CONTROLLED PAD FOR EFFECTIVE PAINT STRIPPING

(71) Applicant: SIKORSKY AIRCRAFT CORPORATION, Stratford, CT (US)

(72) Inventors: Xiaomei Yu, Westport, CT (US); Julie Anne Mauro, North Haven, CT (US); Lesly Ntanyi, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 286 days.

(21) Appl. No.: 15/504,212

(22) PCT Filed: Sep. 23, 2015

(86) PCT No.: PCT/US2015/051595
§ 371 (c)(1),
(2) Date: Feb. 15, 2017

(87) PCT Pub. No.: WO2016/049111
PCT Pub. Date: Mar. 31, 2016

(65) Prior Publication Data
US 2017/0274701 A1    Sep. 28, 2017

Related U.S. Application Data

(60) Provisional application No. 62/054,542, filed on Sep. 24, 2014.

(51) Int. Cl.
*B44D 3/16* (2006.01)
*C09D 9/04* (2006.01)
(Continued)

(52) U.S. Cl.
CPC .............. *B44D 3/16* (2013.01); *B44D 3/166* (2013.01); *C09D 9/04* (2013.01); *F28D 20/02* (2013.01); *F24V 30/00* (2018.05); *Y10T 428/14* (2015.01)

(58) Field of Classification Search
CPC ........ B08B 7/0028; B44D 3/16; B44D 3/166; C09J 7/20; Y10S 428/906; Y10T 428/28;
(Continued)

(56) References Cited

U.S. PATENT DOCUMENTS 3,905,185 A * 9/1975 Bauer .................... D02J 13/00
34/624
5,102,493 A * 4/1992 Bestgen ................... B44D 3/16
156/767

(Continued)

OTHER PUBLICATIONS

EP Communication; Extended European Search Report; Application No. 15843802.8-1014/3197687 PCT/US2015051595; dated Apr. 12, 2018; pp. 1-7.

(Continued)

*Primary Examiner* — Patricia L. Nordmeyer
(74) *Attorney, Agent, or Firm* — Cantor Colburn LLP

(57) ABSTRACT

An assembly for removing a desired portion of one or more layers of paint or another coating from a designated area is provided including a pad soaked with a chemical paint remover and an adhesive layer arranged about the pad configured to couple the assembly to the designated area. A removable first protective layer is positioned upwardly adjacent and is coupled to the adhesive layer. A flexible support layer is positioned adjacent the adhesive layer and the pad, opposite the removable first protective layer. A heat pad is arranged downwardly adjacent the flexible support layer. The heat pad is configured to control a microclimate adjacent the assembly when activated. A removable second protective layer is coupled to a surface of the heat pad. Removal of the second protective layer activates the heat pad.

8 Claims, 4 Drawing Sheets

(51) Int. Cl.
*F28D 20/02* (2006.01)
*F24V 30/00* (2018.01)

(58) Field of Classification Search
CPC ....... Y10T 428/24777; Y10T 428/1405; Y10T 428/14; Y10T 428/24793; C09D 9/04; F28D 20/02; F24J 1/00; F24V 30/00
See application file for complete search history.

(56) References Cited

U.S. PATENT DOCUMENTS

| | | |
|---|---|---|
| 5,124,062 A | 6/1992 | Stevens |
| 6,030,519 A | 2/2000 | Keller et al. |
| 7,960,000 B2 | 6/2011 | Newman |
| 9,278,796 B2 * | 3/2016 | Huffer .................... B65D 65/14 |
| 2004/0191507 A1 | 9/2004 | Levitt et al. |
| 2013/0345649 A1 | 12/2013 | Stockley, III et al. |

OTHER PUBLICATIONS

International Preliminary Report on Patentability for International Appln. No. PCT/US2015/051595; International Filing Date: Sep. 23, 2015; dated Mar. 28, 2017; 6 pages.
International Search Report for International Appln. No. PCT/US2015/051595; International Filing Date: Sep. 23, 2015; dated Dec. 22, 2015; 11 pages.
Written Opinion of the International Searching Authority for International Application No. PCT/US15/51595 dated Nov. 21, 2015; dated Dec. 22, 2015; 5 pages.

* cited by examiner

MICROCLIMATE CONTROLLED PAD FOR EFFECTIVE PAINT STRIPPING

CROSS REFERENCE TO RELATED APPLICATIONS

This application is a National Stage application of PCT/US2015/051595, filed Sep. 23, 2015, which claims the benefit of U.S. Provisional Application No. 62/054,542, filed Sep. 24, 2014, both of which are incorporated by reference in their entirety herein.

BACKGROUND OF THE INVENTION

Exemplary embodiments of the invention relate to a method for removing paint from a surface, and more particularly, to a method and assembly for locally removing paint using hazardous air pollutant (HAP) free chemicals.

Typically, the fuselage of an aircraft includes a metal substrate finished with one or more layers of paint or another coating, to protect the aircraft from environmental damage. The one or more layers may be removed from a designated portion of the metal substrate during manufacture or maintenance of the aircraft, such as for nondestructive inspection of a local area, electrical ground polishing for example, or alternatively during maintenance of the aircraft, such as to repair a damaged area for example.

Coatings of paint, primer, or the like are commonly removed by treating a desired portion of the aircraft with a stripping chemical mixture that includes a strong solvent having volatile chlorinated hydrocarbons, such as methylene chloride for example. When applied, the strong solvent causes the paint to swell and loosen and destroys the hydrogen bonds formed at the interface between the layer of paint and the metal substrate allowing the paint layer to dissociate from the underneath layer and to be scraped or peeled away from the adjacent surface. The most recent environmental, health, and safety regulations prohibit the use of methylene chloride based paint strippers and make the implementation of products free of Hazardous Air Pollutants (HAPs) a viable solution. These products often require repeated application of the stripping chemical mixture and/or application of heat to achieve the desirable stripping effectiveness.

Traditional removal of paint from large objects, such as an airplane, poses inherent dangers not only to the workers involved, but also to the surrounding environment. The chemicals used to remove paint are highly toxic, aggressive, and deleterious. As a result, safety regulations require workers to wear personal protective equipment and work in well-ventilated areas. In addition, during application, the liquid paint remover may run or drip down the aircraft and onto the un-designated area, which may cause damage to the surface of the area, and pose an environmental risk to the surrounding land and ground water as a result of runoff and drainage. The liquid paint remover may also run into faying surfaces, causing long term damage. Significant manufacturing time is added in the masking, preparation, and cleanup of the paint stripping process to minimize potential damage and environmental risk.

BRIEF DESCRIPTION OF THE INVENTION

According to one embodiment of the invention, an assembly for removing a desired portion of one or more layers of paint or another coating from a metal substrate is provided including a pad soaked with a chemical paint remover and an adhesive layer configured to couple the assembly to the coated metal substrate. A removable first protective layer is positioned upwardly adjacent and is coupled to the adhesive layer. A flexible support layer is positioned adjacent the adhesive layer and the pad, opposite the removable first protective layer. A heat pad is arranged downwardly adjacent the flexible support layer. The heat pad is configured to control a microclimate adjacent the assembly when activated. A removable second protection layer is coupled to a surface of the heat pad. Removal of the second protection layer, activates the heat pad.

In addition to one or more of the features described above, or as an alternative, in further embodiments the chemical paint remover has a hazardous air pollutant (HAP) free composition.

In addition to one or more of the features described above, or as an alternative, in further embodiments at least one of a size and shape of the pad is generally complementary to the desired portion.

In addition to one or more of the features described above, or as an alternative, in further embodiments at least one of a size and shape of the heat pad is complementary to the pad soaked with chemical paint remover.

In addition to one or more of the features described above, or as an alternative, in further embodiments an exothermic chemical reaction in the heat pad is activated in response to contact with air.

In addition to one or more of the features described above, or as an alternative, in further embodiments the microclimate includes a local temperature and moisture level.

In addition to one or more of the features described above, or as an alternative, in further embodiments a first surface of the adhesive layer includes an adhesive material.

In addition to one or more of the features described above, or as an alternative, in further embodiments the adhesive material is configured to retain the first protective layer within the assembly.

According to another embodiment of the invention, a method of removing one or more layers of paint or another coating from a desired area of a coated metal substrate is provided including removing a first protective layer of a stripping assembly. The stripping assembly is attached to the coated metal substrate such that a pad of the stripping assembly, pre-soaked with a chemical paint remover, is positioned directly adjacent the desired area. The assembly is activated and then removed.

In addition to one or more of the features described above, or as an alternative, in further embodiments the stripping assembly is activated by removing a removable second protective layer from a surface of the heat pad.

In addition to one or more of the features described above, or as an alternative, in further embodiments removal of the second protective layer causes an exothermic chemical reaction in response to exposure of a portion of the heat pad to air.

In addition to one or more of the features described above, or as an alternative, in further embodiments an adhesive material formed on a first surface of an adhesive layer is configured to couple the stripping assembly to the coated metal substrate.

In addition to one or more of the features described above, or as an alternative, in further embodiments the chemical paint remover has a hazardous air pollutant (HAP) free composition.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
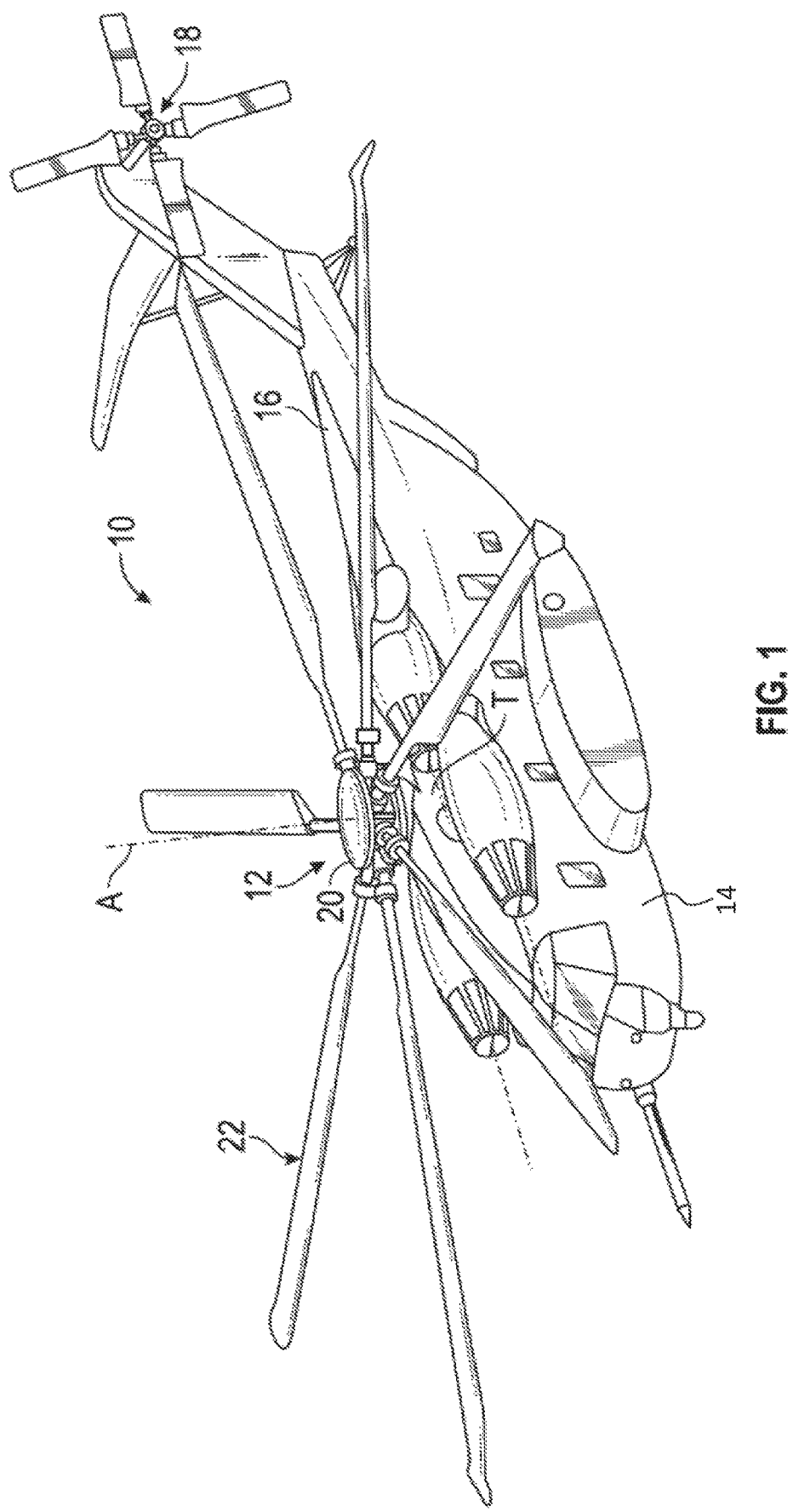
FIG. 1 is a perspective view of an exemplary rotary wing aircraft embodiment for use with the present invention.

FIG. 1 schematically illustrates an example of a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the invention.

Figure 2:
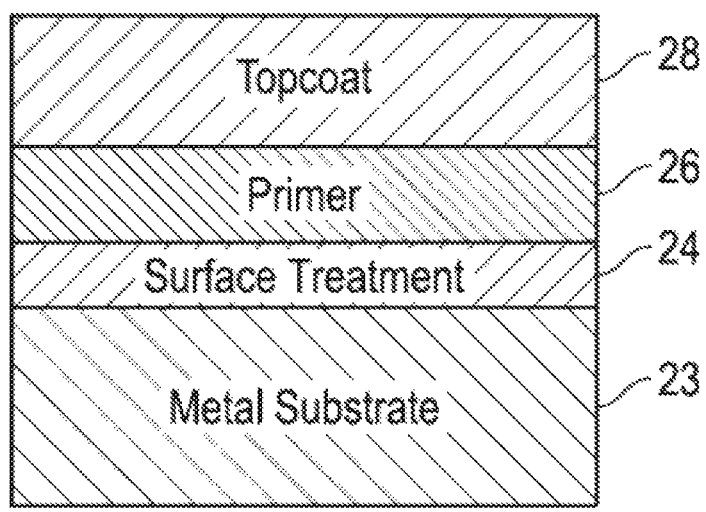
FIG. 2 is a cross-sectional view of an example of a fuselage including a metal substrate having one or more layers of coating or paint applied thereto.

An example of a cross-section of a portion of the airframe 14 is illustrated in more detail in FIG. 2. In the illustrated, non-limiting embodiment, a surface treatment layer 24 is formed directly over the metal substrate 23 of the airframe 14. The airframe 14 additionally includes a layer of primer 26 and a layer of topcoat 28 configured to provide the airframe 14 with an aesthetic appearance including a desired color and finish. The cross-section of the airframe 14 illustrated and described herein is intended as an example, and other metal substrates having one or more layers of a variety of coatings or paints are within the scope of the invention.

Figure 3:
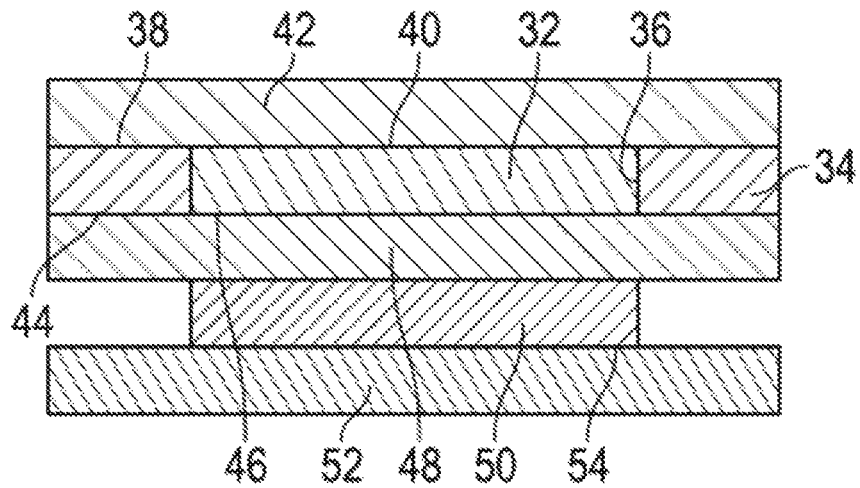
FIG. 3 is a cross-sectional view of a paint stripping assembly according to an embodiment of the invention.
Figure 4A:
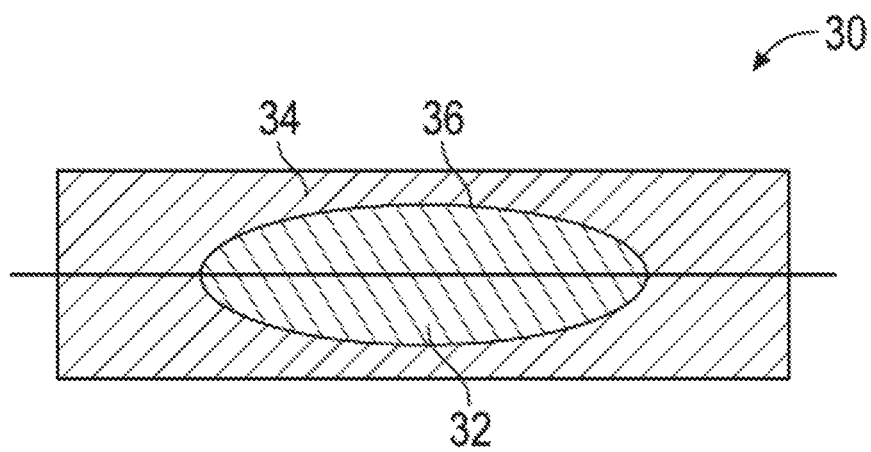
FIGS. 4a and 4b are top and bottom views of the paint stripping assembly in an active state according to an embodiment of the invention.
Figure 4B:
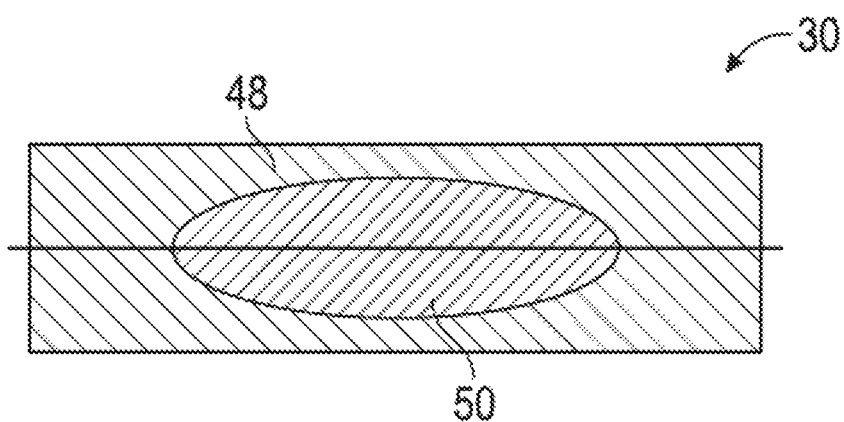

Referring now to FIGS. 3 and 4, an assembly 30 for locally removing paint from a designated portion of the airframe 14 of the rotary wing aircraft 10 of FIG. 1 for example, is illustrated. Although the assembly 30 is illustrated and described herein with reference to removing one or more layers of coating or paint from a metal substrate 23 of the airframe 14 of a rotary wing aircraft 10, the assembly 30 may be used to remove coatings from metal surfaces of other large objects including, but not limited to, fixed wing aircrafts, freight cars, and ships for example. A first layer of the assembly 30 includes a pad 32 pre-soaked with chemical paint stripper or paint remover configured to remove one or more layers of paint or another polyurethane or epoxy based coating from a metal substrate. In one embodiment, the chemical is a hazardous air pollutant (HAP) free, such as a hydrogen peroxide based stripper for example. Although the illustrated pad 32 is generally elliptical in shape, the pad 32 may be configured to have any shape and size complementary to a desired portion of the aircraft 10 from which the paint or another coating is intended to be removed.

Surrounding at least a portion of the pad 32 is an adhesive layer 34. The adhesive layer 34 may have a thickness equal to the pad 32 such that adjacent surfaces of the pad 32 and the adhesive layer 34 are substantially flush. In one embodiment, the adhesive layer 34 includes an opening 36 having a size and shape similar to the pad 32. As shown, the pad 32 may be positioned within the opening 36 such that the adhesive layer 34 protects the periphery of the pad 32 from exposure to air, which may decrease the effectiveness of the chemical solvent or paint remover contained therein. During application of the assembly 30 to an aircraft 10, an adhesive material (not shown) arranged on a first surface 38 of the adhesive layer 34 is configured to contact and adhere to the airframe 14 of the aircraft 10 near the desired portion from which the one or more layers of paint or another coating are to be removed.

Positioned upwardly adjacent the first surface 38 of the adhesive layer 34 and the first surface 40 of the pad 32 is a removable protective layer 42. In one embodiment, the adhesive material (not shown) on the first surface 38 of the adhesive layer 34 may be used to retain the protective layer 42 in position relative to the assembly 30. The protective layer 42 may be formed from a material, such as plastic for example, that is easily removable from the adhesive material without significantly degrading the adhesion strength of the adhesive material. The protective layer 42 is intended to prevent evaporation of the chemical paint remover within the pad 32 due to exposure to air, prior to the assembly 30 being applied to a portion of an aircraft 10. In addition, the protective layer 42 similarly prevents contamination of the adhesive material configured to couple the assembly 30 to the aircraft 10 during the paint stripping process.

Positioned adjacent a second, opposite surface 44, 46 of the adhesive layer 34 and the pad 32, respectively, is a support layer 48 formed from a flexible chemical resistant material that is compatible with the chemical solvent stored within the pad 32. Coupled downwardly adjacent the support layer 48 is a heat pad 50. In the illustrated, non-limiting embodiment, the heat pad 50 has a size and shape generally complementary to the pad 32 soaked with chemical solvent or paint remover. A removable activation or protection layer 52 is disposed in contact with a surface 54 of the heat pad 50 opposite the support layer 48. The heat pad 50 is a conventional type of heat pad 50 configured to have an exothermic chemical reaction upon activation, such as by removal of the adjacent protection layer 52. In one embodiment, iron oxidation is configured to occur upon the unsealing and exposure of surface 54 of the heat pad 50 to air. However, heat pads 50 configured to have other types of chemical reactions are within the scope of the invention. Upon activation of the heat pad by removal of the protection layer 52, the heat pad 50 is configured to generate heat for a limited length of time, such as up to about eight hours for example. Inclusion of the heat pad 50 in the assembly 30 is intended to control the temperature and relative humidity of the area as the chemical solvent of pad 32 erodes the one or more layers of paint or coating applied to the metal substrate 23.

Figure 5:
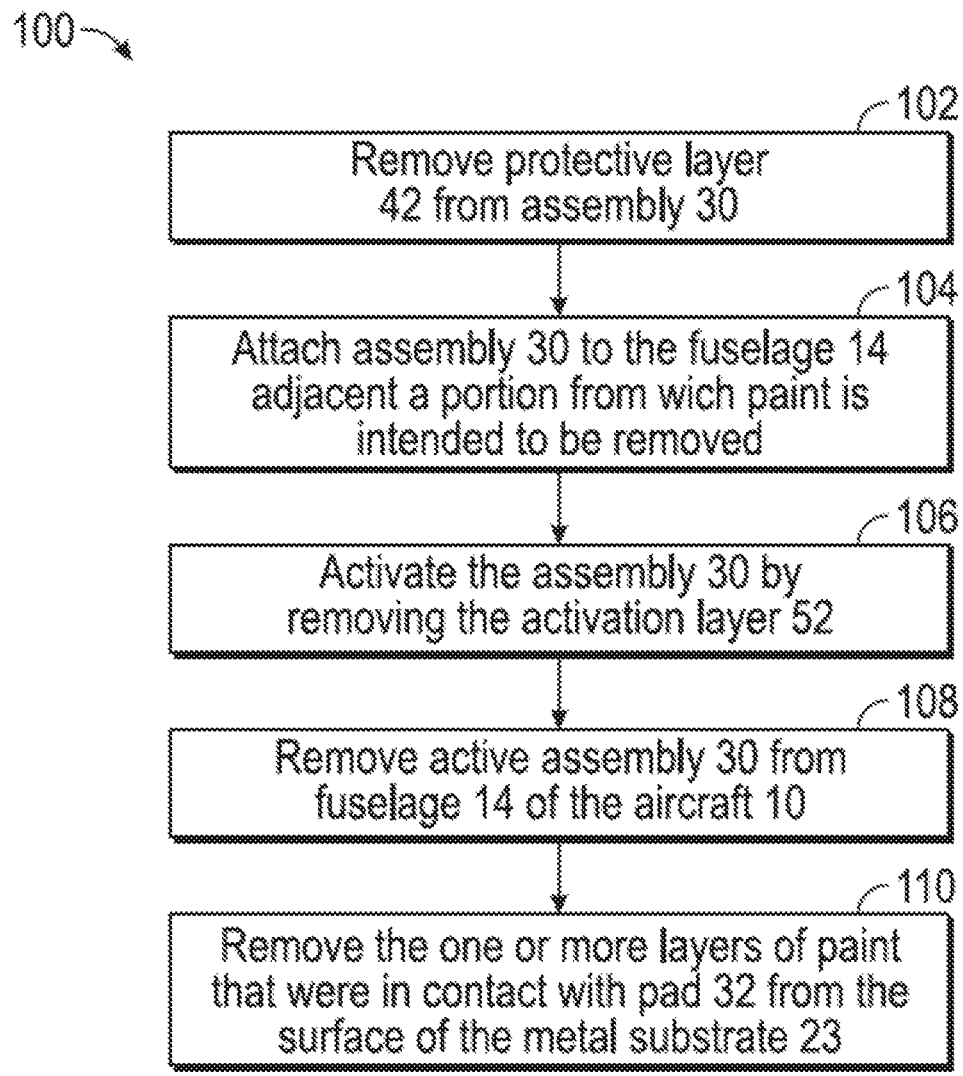
FIG. 5 is method of removing one or more layers of paint or other coating from a surface of a metal substrate.

Referring now to FIG. 5, a method 100 of removing one or more layers of paint or another coating from a surface of a metal substrate 23 includes removing the protective layer 42 from the assembly 30, as shown in block 102. In block 104, the assembly 30 is attached to the airframe 14 of the aircraft 10. The exposed first surface 38 of the adhesive layer 34 is attached to a portion of the airframe 14 such that the exposed first surface 40 of the pad 32 is in contact with a desired area from which paint and/or other coatings are intended to be stripped. The assembly 30 is then activated, in block 106, by removing the protection layer 52 from the surface 54 of the heat pad 50, thereby exposing the heat pad 50 to the ambient air. Activation of the heat pad 50 allows the chemical paint remover within the pad 32 to interact with the paint at an elevated temperature. The activated assembly 30 remains attached to the aircraft 10 for a desired period of time, generally no longer than two hours.

While the activated assembly 30 is attached to the aircraft 10, the chemical solvent penetrates through the one or more layers of coating or paint applied to the metal substrate 23. Upon reaching the metal substrate, the chemical solvent breaks down the bonds extending between the metal substrate and an adjacent layer of coating or paint to dissociate the paint from the metal substrate. After sufficient time, the assembly 30 is removed from the surface of the aircraft 10, in block 108. In block 110, the swollen portion of the one or more layers of paint that were arranged in contact with the pre-soaked pad 32 are removed, such as by scraping for example, to expose the metal substrate 23 of the aircraft 10.

The assembly 30 described herein more efficiently removes one or more layers of paint or another coating from a desired portion of a metal substrate 23 by controlling the microclimate of the desired area. More specifically, the assembly 30 is configured to control the local temperature, the ambient temperature, the ambient airflow, the relative humidity, and the effective concentration of the chemical solvent. As a result, a single assembly 30 is sufficient to remove the one or more layers of paint from a metal substrate 23, and no reapplication of the chemical solvent is necessary. The improved control provided by the assembly 30 allows for easy application of the chemical solvent to the desired area while minimizing waste, such as of the chemical solvent and masking materials, and the risk of contact or exposure to the chemical solvent. In addition, the assembly 30 acts as a masking agent to prevent the chemical paint stripper from affecting adjacent areas.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An assembly for removing a one or more layers of paint or another coating from a designated area, comprising:
    a pad soaked with a chemical paint remover;
    an adhesive layer arranged about a periphery of the pad configured to couple the assembly to the designated area;
    a removable first protective layer positioned adjacent and coupled to a first surface of the adhesive layer;
    a flexible support layer positioned adjacent a second surface of the adhesive layer and the pad, opposite the removable first protective layer;
    a heat pad arranged adjacent a surface of the flexible support layer, the heat pad being configured to control a microclimate adjacent the assembly when activated; and
    a removable second protective layer coupled to a surface of the heat pad, wherein removal of the second protective layer activates the heat pad.

2. The assembly according to claim 1, wherein the chemical paint remover has a hazardous air pollutant (HAP) free chemical composition.

3. The assembly according to claim 1, wherein at least one of a size and shape of the pad is generally complementary to the designated area.

4. The assembly according to claim 1, wherein at least one of a size and shape of the heat pad is generally complementary to the pad soaked with chemical paint remover.

5. The assembly according to claim 1, wherein an exothermic chemical reaction in the heat pad is activated in response to contact with air.

6. The assembly according to claim 1, wherein the microclimate includes a local temperature and moisture level.

7. The assembly according to claim 1, wherein a first surface of the adhesive layer includes an adhesive material.

8. The assembly according to claim 7, wherein the adhesive material is configured to retain the first protective layer within the assembly.

* * * * *